(12) United States Patent
Fu et al.

(10) Patent No.: US 12,050,327 B2
(45) Date of Patent: Jul. 30, 2024

(54) IMAGING SYSTEM AND METHOD OF MANUFACTURING A METALENS ARRAY

(71) Applicant: Applied Materials, Inc., Santa Clara, CA (US)

(72) Inventors: Jinxin Fu, Fremont, CA (US); Tapashree Roy, Bangalore (IN); Ludovic Godet, Sunnyvale, CA (US); Wayne McMillan, San Jose, CA (US); Robert J Visser, Menlo Park, CA (US)

(73) Assignee: Applied Materials, Inc., Santa Clara, CA (US)

( * ) Notice: Subject to any disclaimer, the term of this patent is extended or adjusted under 35 U.S.C. 154(b) by 215 days.

(21) Appl. No.: 16/537,326

(22) Filed: Aug. 9, 2019

(65) Prior Publication Data
US 2020/0393599 A1 Dec. 17, 2020

(30) Foreign Application Priority Data

Jun. 14, 2019 (IN) .............................. 201941022140

(51) Int. Cl.
*G02B 3/00* (2006.01)
*G02B 27/01* (2006.01)

(52) U.S. Cl.
CPC ......... *G02B 3/0068* (2013.01); *G02B 3/0012* (2013.01); *G02B 27/0172* (2013.01)

(58) Field of Classification Search
CPC ............... G02B 3/0068; G02B 3/0012; G02B 27/0172; G02B 27/30; G02B 1/002; G02B 5/1861; G02B 2027/0178
See application file for complete search history.

(56) References Cited

U.S. PATENT DOCUMENTS

| | | | |
|---|---|---|---|
| 7,019,890 B2 | 3/2006 | Meredith et al. |
| 7,115,525 B2 | 10/2006 | Abatchev et al. |
| 7,366,351 B2 | 4/2008 | Walmsley et al. |
| 8,189,263 B1 | 5/2012 | Wang et al. |
| 8,715,516 B2 | 5/2014 | Sakamoto et al. |
| 9,151,891 B2 | 10/2015 | Ma et al. |

(Continued)

FOREIGN PATENT DOCUMENTS

| | | |
|---|---|---|
| CN | 109196387 A | 1/2019 |
| CN | 109343219 A | 2/2019 |

(Continued)

OTHER PUBLICATIONS

International Search Report/Written Opinion issued in PCT/US2020/033604 on Sep. 1, 2020.

(Continued)

*Primary Examiner* — Alicia M Harrington
(74) *Attorney, Agent, or Firm* — Patterson + Sheridan, LLP (57) ABSTRACT

An imaging system and a method of manufacturing a metalens array is provided. The imaging system includes a metalens array, and light scattered from an object is split by the metalens array, such that an image is formed in front of an observer. The metalens array is at least partially transparent to visible light, so that the observer can also see the environment. The method of manufacturing the metalens array includes bonding together a plurality of substrates, and dicing the plurality of substrates into metalens arrays. The metalens arrays can be used in the imaging system.

20 Claims, 5 Drawing Sheets

(56) References Cited

U.S. PATENT DOCUMENTS

| | | | |
|---|---|---|---|
| 9,190,736 B1* | 11/2015 | Burckel | H01L 51/0008 |
| 9,298,060 B2 | 3/2016 | Shen et al. | |
| 9,946,075 B1 | 4/2018 | Hu | |
| 10,761,328 B2* | 9/2020 | Hu | G02B 27/0172 |
| 2002/0044345 A1 | 4/2002 | Takeuchi et al. | |
| 2004/0190338 A1 | 9/2004 | Lee | |
| 2005/0233487 A1 | 10/2005 | Liu et al. | |
| 2012/0183288 A1* | 7/2012 | Kishinami | G02B 13/0085 |
| | | | 396/505 |
| 2012/0314991 A1 | 12/2012 | Kang et al. | |
| 2014/0241661 A1 | 8/2014 | Chen et al. | |
| 2015/0219806 A1 | 8/2015 | Arbabi et al. | |
| 2016/0252727 A1 | 9/2016 | Mack et al. | |
| 2018/0172988 A1* | 6/2018 | Ahmed | H01L 33/58 |
| 2018/0188542 A1* | 7/2018 | Waldern | G02B 27/0172 |
| 2018/0217186 A1 | 8/2018 | Pfefferlein et al. | |
| 2018/0231702 A1 | 8/2018 | Lin et al. | |
| 2018/0284428 A1 | 10/2018 | Guenter | |
| 2018/0292676 A1 | 10/2018 | Alexander | |
| 2018/0306425 A1 | 10/2018 | Massmann et al. | |
| 2018/0337743 A1 | 11/2018 | Jou et al. | |
| 2019/0086683 A1 | 3/2019 | Aieta et al. | |
| 2019/0121004 A1 | 4/2019 | Ahmed et al. | |
| 2019/0137762 A1 | 5/2019 | Hu | |
| 2019/0137777 A1 | 5/2019 | Yang et al. | |
| 2019/0146151 A1 | 5/2019 | Meister et al. | |
| 2019/0154877 A1 | 5/2019 | Capasso et al. | |
| 2020/0011514 A1 | 1/2020 | Fu | |
| 2020/0249429 A1* | 8/2020 | Han | G02B 5/1895 |
| 2020/0284960 A1* | 9/2020 | Ellenbogen | G02B 5/20 |
| 2021/0028215 A1* | 1/2021 | Devlin | H01L 27/14621 |

FOREIGN PATENT DOCUMENTS

| | | |
|---|---|---|
| CN | 109799611 A | 5/2019 |
| JP | H11248989 A | 9/1999 |
| JP | 2010504631 A | 2/2010 |
| JP | 2020047874 A | 3/2020 |
| JP | 2018528446 A | 10/2020 |
| KR | 1020110070571 A | 6/2011 |
| KR | 1020190052544 A | 5/2019 |
| TW | 200741328 A | 11/2007 |
| WO | 2016168173 A1 | 10/2016 |
| WO | 2018142339 A1 | 8/2018 |
| WO | 2018204856 A1 | 11/2018 |
| WO | 2018210776 A1 | 11/2018 |
| WO | 2019062480 A1 | 4/2019 |
| WO | 2019067912 A | 4/2019 |

OTHER PUBLICATIONS

Composite functional metasurfaces for multispectral achromatic optics, Avayu et al., Nature Communications 8, 14992 (2017).
Achromatic metalens over 60 nm bandwidth in the visible and metalens with reverse chromatic dispersion, Khoraseninejad et al., Nano Letters 17, 1819 (2017).
GaN metalens for pixel-level full-cover routing at visible light, Chen et al., Nano Letters 27, 6345 (2017).
Technology, www.light.co/technology <http://www.light.co/technology>, retrieved Apr. 9, 2019.
A broadband achromatic metalens for focusing and imaging in the visible, Chen et al., Nature Nanotechnology 13, 220 (2018).
Broadband high-efficiency dielectric metasurfaces for the visible spectrum, Devlin et al., Proceedings of the National Academy of Sciences 13, 10473 (2016).
Multiwavelength achromatic metasurfaces by dispersive phase compensation, Aieta et al., Science 347, 1342 (2015).
Dynamic metasurface lens based on MEMS technology, Roy et al., APL Photonics 3, 021302 (2018).
Letinar Technology, <https://letinar.com/technology/>, retrieved May 21, 2019.
Metasurface eyepiece for augmented reality, Lee et al., Nature Communications 9, 4562 (2018).
International Search Report and Written Opinion for PCT/US2020/033428 dated Oct. 20, 2020.
Taiwan Office Action issued to Application No. 109118434 on Mar. 2, 2021.
International Searh Report/ Written Opinion issued to PCT/US2021/040866 on Oct. 29, 2021.
India Examination Report issued to Application No. 202147061439 on Apr. 18, 2022.
European Search Report issued to Patent Application No. 20817680.0 on May 26, 2023.
Chinese Office Action issued to Application No. 202080053854.X on Jan. 28, 2023.
Japanese Office Action issued to Application No. 2021-571873 on Feb. 15, 2023.
China Office Action issued to patent application No. 202080053854.X on Aug. 17, 2023, no translation.
European Search Report issued to Application No. 20817990.3 on Jun. 15, 2023.
Japanese Office Action issued to Patent Applicatin No. 2021-571873 on Jul. 25, 2023.
Korean Office Action issued to Patent Application No. 10-2021-7043146 on Jan. 24, 2024.

\* cited by examiner

IMAGING SYSTEM AND METHOD OF MANUFACTURING A METALENS ARRAY

CROSS-REFERENCE TO RELATED APPLICATIONS

This application claims priority to Indian Provisional Patent Application No. 201941022140, filed Jun. 4, 2019, which is hereby incorporated by reference in its entirety.

BACKGROUND

Field

Embodiments of the invention relate to an apparatus and a method and, more specifically, to an imaging system and a method of manufacturing a metalens array.

Description of the Related Art

Imaging systems used to take pictures are common in the art, with varied applications, including cameras and scanners. One application of imaging systems is for virtual reality (VR) or augmented reality (AR) systems, where images or holograms are projected to an observer in such a way that the images appear to be real objects, unlike pictures or screens where the object is obviously simply a picture. The image sent to the user can either replace what the user sees, or be added to what the user sees.

In order to project objects to be used in VR or AR applications, the imaging system must be able to project images so that they appear to be in front of the user, which typically requires a variety of collimation optics (for instance, focusing lenses) and light combining optics (for instance, beam splitters, light guides, tiny mirrors and mirror arrays). In the scenario of the mirror arrays system, the mirror arrays reflect the image of the object so that the image appears to be in front of the user, giving the user a VR experience. In addition, if the imaging system allows the user to also see his or her environment, the combination of the image and the environment allows for an AR experience.

One drawback in the art is that mirror arrays block the vision of the user, which makes projecting the image onto the user's environment more difficult. The mirrors can blur the user's view of the real world, and the metallic shine of the mirrors are distracting for the user. In addition, arrays of mirrors are hard to manufacture, and controlling spacing and alignment of mirrors is a costly and time-consuming process. Also, the imaging systems in the art typically also require focusing lenses to be used, adding even more time and cost for the manufacturer to properly align the imaging system.

Therefore, there is a need for imaging systems that allow for increased visibility for the user for VR and AR simulations.

SUMMARY

In one embodiment, an imaging system is provided, including one or more metalens arrays. The one or more metalens arrays include a plurality of metalens elements, and a plurality of substrates, the plurality of metalens elements disposed on the plurality of substrates. The one or more metalens arrays are configured such that a first beam of light incident on the one or more metalens arrays is reflected and collimated into a reflected beam. The one or more metalens arrays are at least partially transparent to visible light in a direction parallel to the direction of the reflected beam.

In another embodiment, an imaging system is provided, including a frame, a lens attached to the frame, and one or more metalens arrays. The one or more metalens arrays include a plurality of metalens elements, and a plurality of substrates, the plurality of metalens elements disposed on the plurality of substrates. The one or more metalens arrays are configured such that a first beam of light incident on the one or more metalens arrays is reflected and collimated into a reflected beam. The one or more metalens arrays are at least partially transparent to visible light in a direction parallel to the direction of the reflected beam.

In another embodiment, a method of manufacturing a metalens array is provided, including bonding together a plurality of substrates to create a substrate stack, dicing the substrate stack into a plurality of metalens arrays, and placing the metalens array into an imaging system. Each substrate includes a plurality of metalens elements.

The imaging system allows the observer to see both the projected object and the environment, allowing for a VR or AR experience. The metalens arrays are easy to manufacture and are compatible with existing semiconductor manufacturing processes, and the metalens arrays can be grown on traditional glass substrates.

BRIEF DESCRIPTION OF THE DRAWINGS

So that the manner in which the above-recited features of the present disclosure can be understood in detail, a more particular description of the embodiments, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure provided herein include an imaging system including a metalens array, and a method of manufacturing a metalens array. The imaging system allows the observer to see both a projected object and the environment of the observer, allowing for a VR or AR experience. The method of manufacturing includes bonding together a stack of substrates, wherein the substrates include a plurality of metalens elements. The stack of substrates is diced into metalens arrays, and the metalens arrays are added to the imaging system. Embodiments of the disclosure may be useful for, but are not limited to, an apparatus using a metalens array for VR or AR experiences.

As used herein, the term "about" refers to a +/−10% variation from the nominal value. It is to be understood that such a variation can be included in any value provided herein.

Figure 1A:
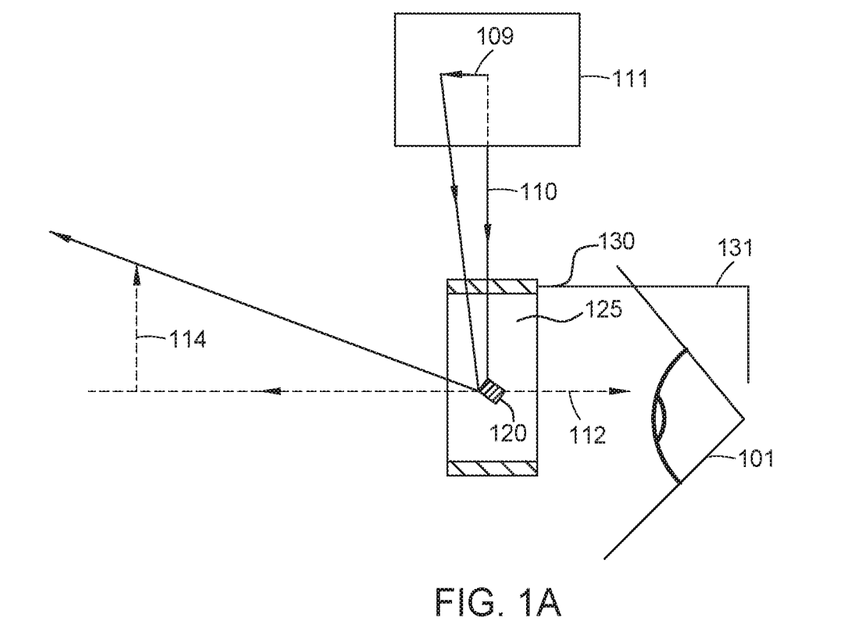
FIGS. 1A and 1B illustrate an imaging system, according to one embodiment.

FIG. 1A illustrates an imaging system 100, according to one embodiment. As shown, the imaging system 100 includes one or more metalens arrays 120, a frame 130, a fastener 131, an eyepiece 125, and a micro display 111. The frame 130 holds the eyepiece 125 with respect to an observer 101, according to one embodiment. The one or more metalens arrays 120 are embedded in the eyepiece 125, according to one embodiment. Although only one metalens array 120 is shown for clarity, it is understood that the imaging system 100 can include any number of metalens arrays, such as 1 to 100 metalens arrays. The metalens arrays 120 can be arranged in any desired arrangement, such as a grid, or rows and columns of the metalens array. The metalens arrays 120 can be separated from each other by a distance of from about 1 mm to about 1 cm. The frame 130 can include fasteners 131, which secure the imaging system 100 to the observer 101.

A first beam of light 110 emanates from an object 109. In some embodiments, the object 109 is present on the micro display 111, the micro display displays the object which is to be shown to the observer, and the first beam of light 110 is created from each pixel of the micro display. The first beam of light 110 is incident on the metalens array 120. The metalens array 120 collimates and reflects the beam of light 110 to a reflected beam 112. The reflected beam 112 forms a virtual image 114, which is seen by the observer 101. The virtual image 114 is created from the real image 109 on the micro display 111, and the image is upstream from the observer 101, according to one embodiment. The first beam of light 110 is reflected and collimated to the reflected beam 112 because the metalens array 120 is configured such that the first beam of light reflects off of the metalens array. Each of the metalens arrays 120 are composed of nanostructure features with spatially varying dimensions (height, width, diameters, etc.). The nanostructure features with different sizes generate different phase delays to incident light. The nanostructure features of the metalens arrays 120 can be designed in such a way that the metalens array functions as a reflective lens, such as a parabolic mirror. Therefore, light from a single pixel on the micro display 111 will be reflected and collimated into a parallel beam by the metalens arrays 120, and then re-focused by human eye of the observer 101 onto a single pixel on the retina of the eye.

Figure 1B:
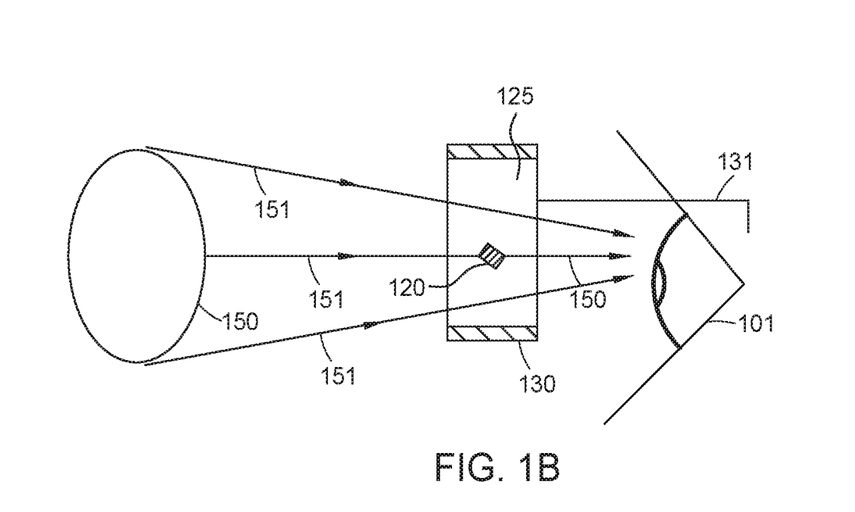

FIG. 1B illustrates the imaging system 100 of FIG. 1A, according to one embodiment. It is to be understood that the imaging system 100 of FIG. 1B is the same as the imaging system of FIG. 1A, and that the additional figure is shown for clarity. An environment light beam 151 is scattered from an environment 150, which is incident on the metalens array 120. The metalens array 120 is constructed such that metalens array is at least partially transparent to the environment light beam 151, such that the observer 101 can see the environment 150. The environment light beam 151 consists of visible light. The environment light beam 151 passes through the metalens array 120 because the metalens array is configured such that the metalens array is transparent to the environment light beam. The phase delay imposed by the nanostructure features of the metalens array 120 is sensitive to the incident angle of the environment light beam 151. The reflective metalens array 120 is designed such that it only efficiently reflects and collimates light incident within a certain angle range, while the metalens arrays has a lesser effect on light outside this angle range. In addition, due to the small size of the metalens arrays 120, the environment light beam 151 can pass around the metalens arrays, increasing visibility of the environment 150 for the observer 101.

The imaging system 100 as described allows the observer 101 to see both the virtual image 114 and the environment 150, and thus the imaging system 100 is an AR imaging system, allowing for an augmented reality experience for the observer 101, according to one embodiment. For example, the imaging system 100 is a headset, glasses, or goggles, the frame 130 can secure the glasses, goggles, or headset to the ears of the observer 101 by fasteners 131 (e.g., earhooks or glasses arms), and the metalens array 120 is part of the eyepiece 125 of the headset, glasses, or goggles. For example, if the observer 101 is using the imaging system to play a video game, the micro display 111 can project the object 109 from the game such that the object appears as a part of the environment 150 of the observer, allowing for a merging of the video game and reality.

Traditional beam splitters or mirrors are not transparent to visible light, allowing the observer 101 to see only the virtual image 114, and not the environment 150. Traditional beam splitters or mirrors can only be made to a certain size, making them obvious and leading to unattractive metallic spots caused by the mirrors in the lenses of eyewear. In addition, metalens arrays 120 are lighter than traditional beam splitters. Also, metalens arrays 120 do not require additional lenses to focus light.

Figure 1C:
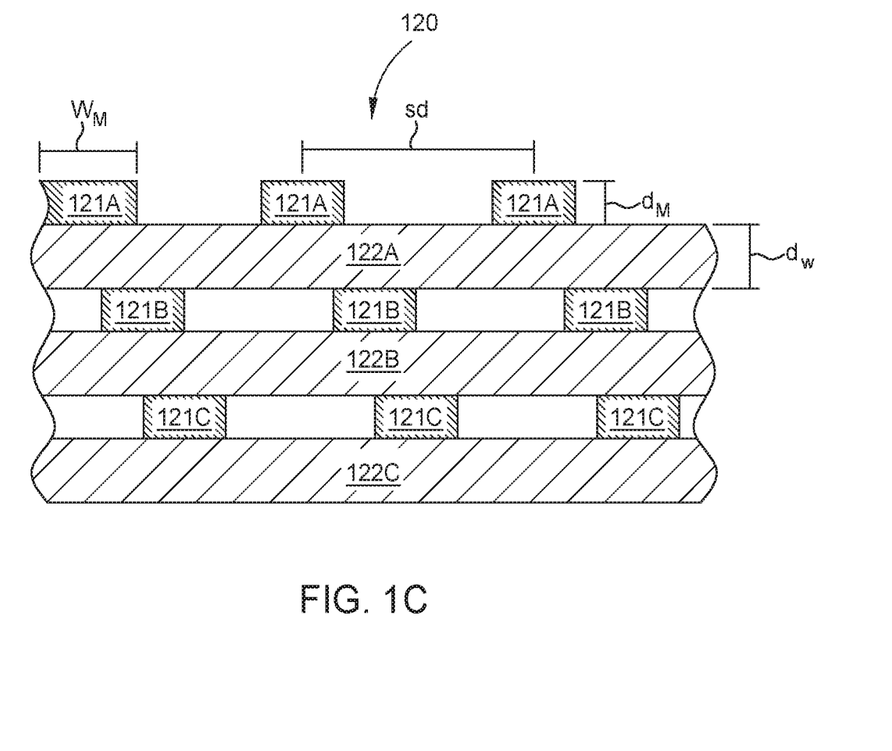
FIG. 1C illustrates a metalens array, according to one embodiment.

FIG. 1C illustrates the metalens array 120, according to one embodiment. As shown, the metalens array 120 includes a plurality of metalens elements 121A, 121B, 121C, and one or more substrates 122A, 122B, 122C. Although three sets of metalens elements 121 and three substrates 122 are shown, any number of metalens elements or substrates can be used. Substrate 122A includes a plurality of metalens elements 121A, substrate 122B includes a plurality of metalens elements 121B, and substrate 122C includes a plurality of metalens elements 121C. It is important to note that the metalens elements 121 are extremely thin in comparison to the thickness of the substrates 122, and the thickness of the metalens elements is exaggerated for clarity. The width $w_m$ of the metalens elements 121 range from about 100 um to about 2 mm. The separation distance sd between adjacent metalens elements 121 range from about 0.5 mm to about 1 cm. The thickness $d_m$ of the metalens elements 121 range from about 10 nm to about 2 um. The thickness $d_m$ of the metalens elements 121 is much smaller than traditional lenses, resulting in less bulk. In addition, the total size of the metalens array 120 can be increased for higher resolution imaging systems 100, because the larger metalens array does not interfere with the vision of the observer 101, as the metalens array is transparent.

The metalens elements 121B on substrate 122B can be arranged such that the metalens elements 121A are not directly above the metalens elements 121B, as shown in FIG. 1C. Likewise, the metalens elements 121B on substrate 122B can be arranged such that the metalens elements 121C on substrate 122C are not directly below the metalens elements 121B. The metalens elements 121 do not overlap with each other, so that after bonding and dicing the substrates as described below, each of the metalens elements can be used to image different part of the micro display 111. The entire image on the micro display 111 will be reflected and collimated by all the metalens elements 111 and fed into human eye of the observer 101.

Figure 1D:
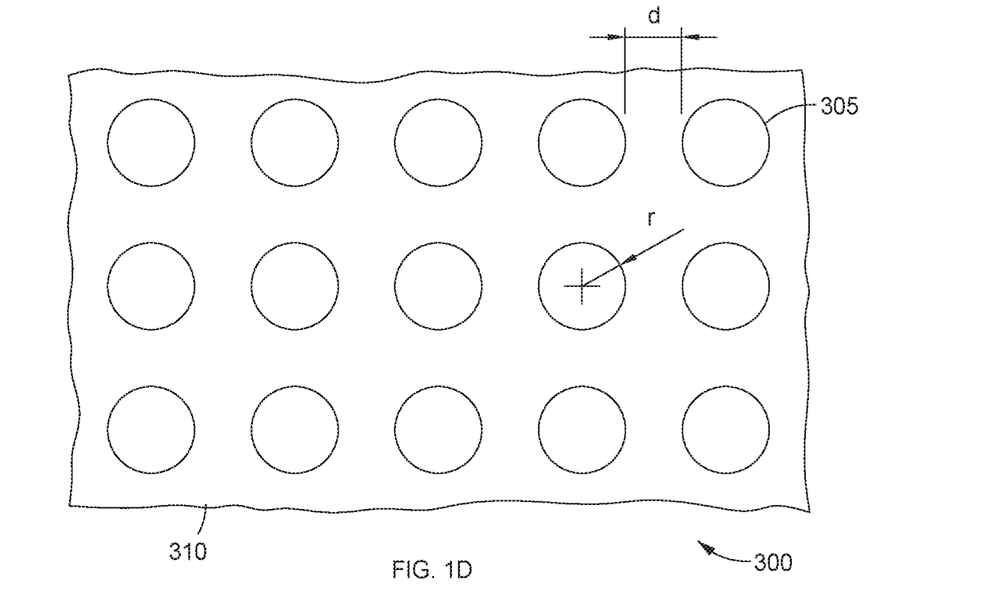
FIG. 1D illustrates an overhead view of a portion of a plurality of metalens features, according to one embodiment.

FIG. 1D illustrates an overhead view of a portion 300 of a plurality of metalens features 305, according to one embodiment. The metalens element 121 includes repeated patterns of the metalens features 305. The metalens features 305 are nanosized columns grown on a substrate 310. The metalens features 305 have differing shapes depending on the desired spectrum of light to filter. The metalens features 305 can be substantially circular, triangular, square, rectangular, or have an uneven shape. The metalens features 305 can be made from any suitable high refractive index material, such as, but not limited to, silicon, silicon oxide, silicon nitride, titanium oxide, tantalum oxide, zirconium oxide, hafnium oxide, gallium arsenide, gallium nitride, and niobium oxide. The metalens features 305 can also be made from metallic materials such as gold (Au), silver (Ag), or copper (Cu). The substrate 310 can be any typical transparent substrate, such as glass or plastic. The substrate 310 can include any number of layers disposed thereon. The substrate 310 is, for example, the substrate 122 of FIG. 1C.

Figure 1E:
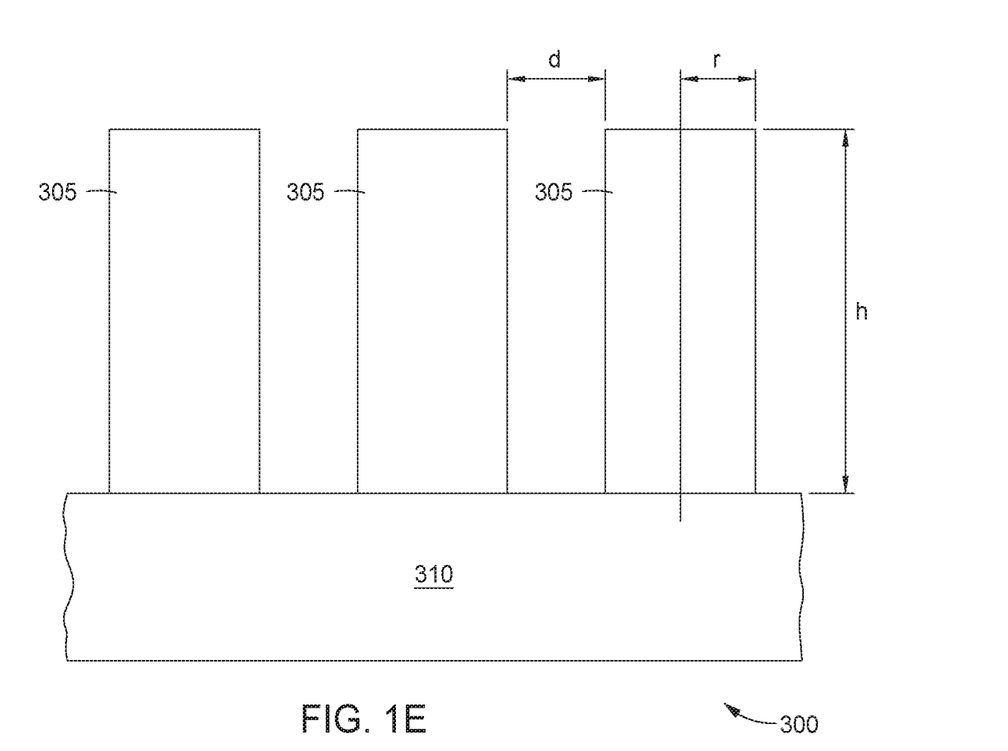
FIG. 1E illustrates a side view of a portion of a plurality of metalens features, according to one embodiment.

FIG. 1E illustrates a side view of the portion 300 of the plurality of metalens features 305, according to one embodiment. The metalens features 305 have a radius of r, which is from about 20 nm to about 500 nm. The metalens features 305 have a height of h, which is from about 10 nm to about 2 µm. The metalens features 305 are separated from each other by a separation distance d, which is from about 30 nm to about 500 nm. The radius, height, shape, material, and feature separation distance of the metalens features 305 are selected to create metalens elements 121 that filters out all but a narrow wavelength band of light.

In one embodiment, the metalens elements 121 have metalens features 305 with circular or elliptical shaped columns, the columns containing silicon dioxide ($SiO_2$), silicon (Si), titanium dioxide ($TiO_2$), gallium nitride (GaN) material, the columns having a radius of about 30 nm to 500 nm, the columns having a height of about 10 nm to 2 um, and the columns having a separation of about 30 nm to 500 nm.

The metalens elements 121 can be designed to focus light at a certain wavelength, and thus can be used to selectively focus visible light of a given color. Some of the metalens elements 121A are designed to focus red light (red metalens element), some of the metalens elements 121A are designed to focus green light (green metalens element), and some of the metalens elements 121A are designed to focus blue light (blue metalens element), according to some embodiments. Each red metalens element 121 is located directly adjacent to at least one green metalens element and at least one blue metalens element, according to one embodiment. A combination of red, green, and blue metalens elements 121 allows for a 3-color red-green-blue (RGB) VR or AR imaging system 100.

The metalens elements 121 can also be designed to focus broadband wavelengths. These achromatic metalens elements 121 will reduce the complexity of the optics, because all RGB colors can be reflected and collimated by one metalens element instead of three.

The substrates 122 can be made of any transparent material. The substrates 122 include glass and/or plastic, according to some embodiments. The substrates 122 have a thickness that varies from about 1 mm to about 1 cm.

The metalens elements 121 reflects the first beam of light 110, and the metalens array 120 collimates the first beam of light into the reflected beam 112. The metalens array 120 is also transparent to visible light, allowing the observer to see the environment 150 at the same time as the virtual image 114, providing an augmented reality experience for the observer. The metalens elements 121 can also be reflective holograms, which function in a similar way as reflective metalens. Holograms can also reflect and collimated light beam simultaneously.

Figure 2:
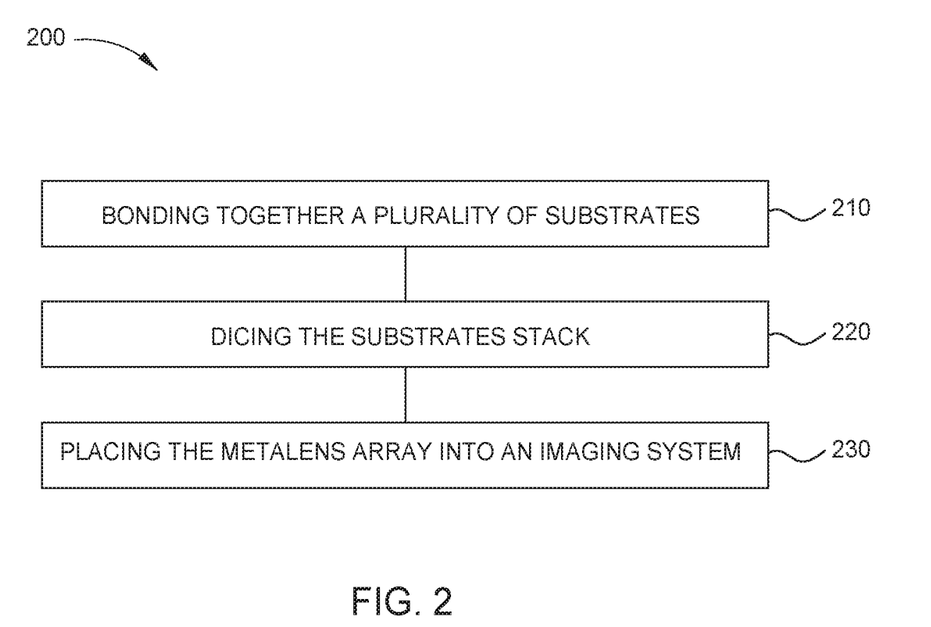
FIG. 2 is a flow chart of method operations for creating a metalens array, according to one embodiment.
Figure 3A:
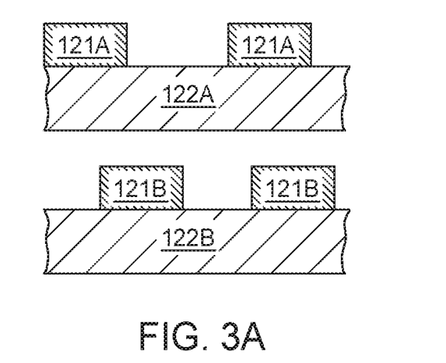
FIG. 3A illustrates a plurality of substrates, according to one embodiment.

FIG. 2 is a flow chart of method 200 operations for creating a metalens array, according to one embodiment. Although the method 200 operations are described in conjunction with FIGS. 2 and 3A-E, persons skilled in the art will understand that any system configured to perform the method operations, in any order, falls within the scope of the embodiments described herein. FIG. 3A illustrates a plurality of substrates 122A, 122B, according to one embodiment. The substrates 122A, 122B have a plurality of metalens elements 121A, 121B disposed thereon. Although two substrates 122 are shown in FIG. 3A, it is understood that any number of substrates could be used.

Figure 3B:
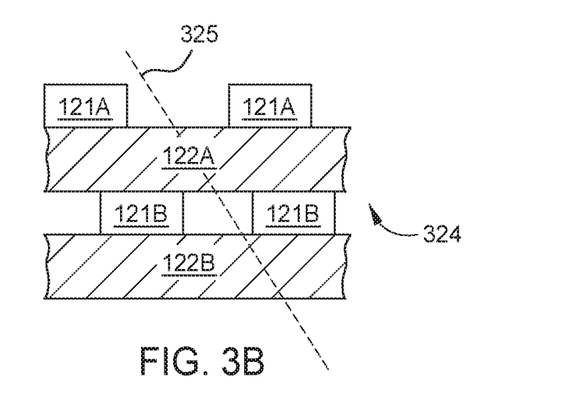
FIG. 3B illustrates a substrate stack, according to one embodiment.

The method 200 starts at operation 210, where the plurality of substrates 122 are bonded to create a substrate stack 324. FIG. 3B illustrates the substrate stack 324, according to one embodiment. The plurality of substrates 122 can be bonded together using any conventional process. For example, the substrates 122 can be bonded by gluing the edges of the substrates together, or by filling the entire space between the substrates with optical glue.

Figure 3C:
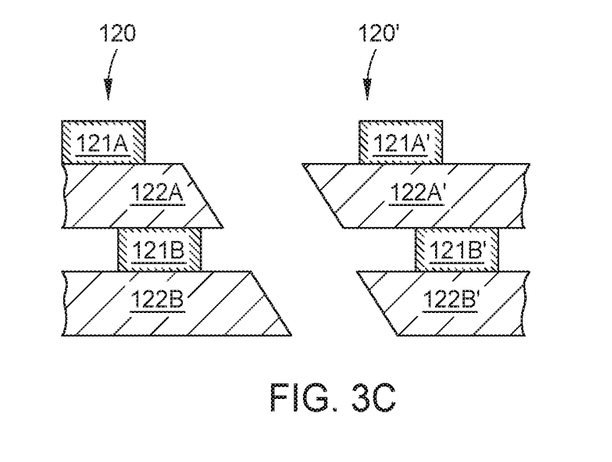
FIG. 3C illustrates metalens arrays created from the substrate stack, according to one embodiment.

At operation 220, the substrate stack 324 is diced into individual metalens arrays 120, 120'. The dice line 325 is shown in FIG. 3B to illustrate the dicing of the substrate stack 324. The substrate stack 325 can be laser diced. In other embodiments, the substrate stack 325 can be diamond scribed, and then the substrate stack is diced afterwards. Although the dice line 325 shown in FIG. 3B is at an angle to the surface of the substrate 122, any arbitrary angle of dicing could be used, such as between about 20° to about 70°. FIG. 3C illustrates metalens arrays 120, 120' created from the substrate stack 324, according to one embodiment. The metalens arrays 120, 120' are similar to the metalens array 120 of FIGS. 1A and 1B.

Figure 3D:
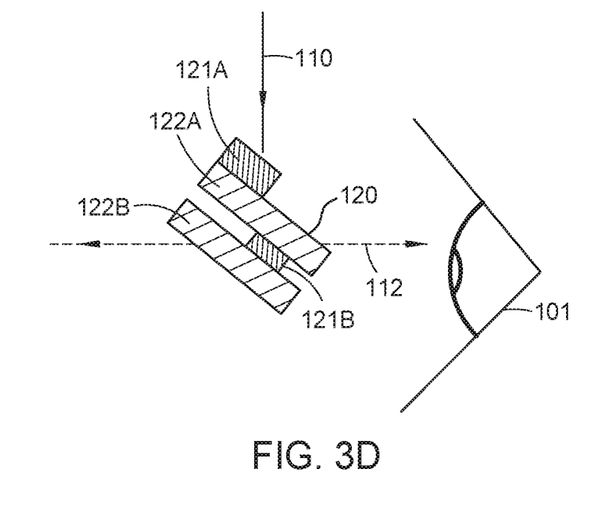
FIG. 3D illustrates a metalens array placed into an imaging system, according to one embodiment.
Figure 3E:
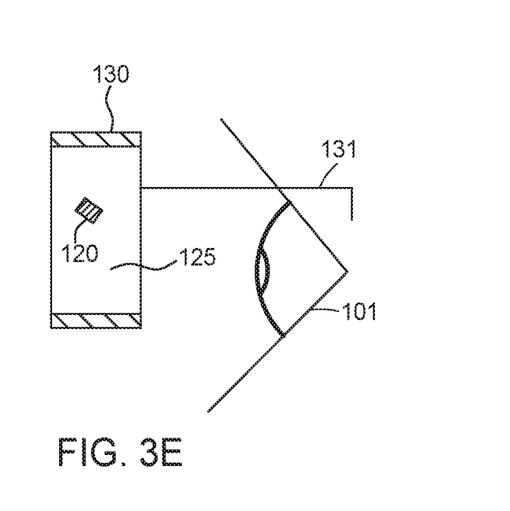
FIG. 3E illustrates an imaging system with a frame, according to one embodiment.

At operation 230, the metalens array 120 is placed in the imaging system 100. FIG. 3D illustrates the metalens array 120 placed into the imaging system 100, according to one embodiment. The metalens array 120 can be embedded into the eyepiece 125, and the eyepiece 125 is attached to the frame 130, according to one embodiment. Although only one metalens array 120 is shown for clarity, it is understood that the imaging system 100 can include any number of metalens arrays, such as 1 to 100, and thus operation 230 can include placing any number of metalens arrays, either one at a time or simultaneously. The metalens arrays 120 can be arranged in any desired arrangement, such as a grid, or rows and columns of the metalens array.

As described above, an imaging system includes a metalens array. Light scatters from the object to be displayed in the imaging system, and the light beam from the micro display is incident on the metalens array. The metalens array reflects and collimates the light to the observer, resulting in a VR or AR experience for the observer. The metalens array is at least partially transparent to visible light, allowing scattered light from the environment to penetrate the metalens array and reach the observer.

The metalens arrays act as reflectors for the image light beam, and the metalens arrays are transparent for light scattered from the environment, allowing the observer to see both the image and the environment. Metalens growth on glass substrates is much simpler than control of curvature and alignment of traditional lens arrays.

While the foregoing is directed to implementations of the present invention, other and further implementations of the invention may be devised without departing from the basic scope thereof, and the scope thereof is determined by the claims that follow.

We claim:

1. An imaging system, comprising:
a metalens array, comprising:
first metalens elements disposed on a first substrate, each of the first metalens elements are spaced from each other, each of the first metalens elements have a first width from a first leading sidewall to a first trailing sidewall; and
second metalens elements disposed on a second substrate and contacting a lower surface of the first substrate and an upper surface of the second substrate, each of the second metalens elements are spaced from each other, wherein:
each of the second metalens elements have a second width from a second leading sidewall to a second trailing sidewall;
the second trailing sidewall extend past the first trailing sidewall of each of the first metalens elements disposed on the first substrate; and
the second leading sidewall of each of the second metalens elements extend past the first leading sidewall of each of the first metalens elements disposed on the first substrate,
wherein the metalens array is configured such that a first beam of light incident on the metalens array is reflected and collimated into a reflected beam, and
the metalens array is at least partially transparent to visible light in a direction parallel to the direction of the reflected beam.

2. The imaging system of claim 1, wherein at least one of the first substrate and the second substrate comprises glass.

3. The imaging system of claim 1, wherein at least one of the first substrate and the second substrate comprises plastic.

4. The imaging system of claim 1, wherein the imaging system is an augmented reality (AR) imaging system.

5. The imaging system of claim 1, further comprising a micro display, wherein light created from the micro display forms the first beam of light.

6. The imaging system of claim 1, further comprising:
third metalens elements disposed on a third substrate and contacting the lower surface of the second substrate and the upper surface of the third substrate, each of the third metalens elements are spaced from each other, wherein:
each of the third metalens elements have a third width from a third leading sidewall to a third trailing sidewall;
the third trailing sidewall of each of the third metalens elements extend past the second trailing sidewall of each of the second metalens elements disposed on the second substrate; and
the third leading sidewall of each of the third metalens elements extend past the second leading sidewall of each of the second metalens elements disposed on the second substrate.

7. An imaging system, comprising:
a frame;
a lens attached to the frame; and
a metalens array disposed in the lens, the metalens array comprising:
first metalens elements disposed on a first substrate, each of the first metalens elements are spaced from each other, each of the first metalens elements have a first width from a first leading sidewall to a first trailing sidewall; and
second metalens elements disposed on a second substrate and contacting a lower surface of the first substrate and an upper surface of the second substrate, each of the second metalens elements are spaced from each other, wherein:
each of the second metalens elements have a second width from a second leading sidewall to a second trailing sidewall;
the second trailing sidewall extend past the first trailing sidewall of each of the first metalens elements disposed on the first substrate; and
the second leading sidewall of each of the second metalens elements extend past the first leading sidewall of each of the first metalens elements disposed on the first substrate,
wherein the metalens array is configured such that a first beam of light incident on the one or more metalens arrays is reflected and collimated into a reflected beam, and
the metalens array is at least partially transparent to visible light in a direction parallel to the direction of the reflected beam.

8. The imaging system of claim 7, wherein at least one of the first substrate and the second substrate comprises glass.

9. The imaging system of claim 7, wherein at least one of the first substrate and the second substrate comprises plastic.

10. The imaging system of claim 7, wherein the imaging system is an augmented reality (AR) imaging system.

11. The imaging system of claim 7, further comprising a micro display, wherein light created from the micro display forms the first beam of light.

12. The imaging system of claim 7, further comprising:
third metalens elements disposed on a third substrate and contacting the lower surface of the second substrate and the upper surface of the third substrate, each of the third metalens elements are spaced from each other, wherein:
each of the third metalens elements have a third width from a third leading sidewall to a third trailing sidewall;
the third trailing sidewall of each of the third metalens elements extend past the second trailing sidewall of each of the second metalens elements disposed on the second substrate; and
the third leading sidewall of each of the third metalens elements extend past the second leading sidewall of each of the second metalens elements disposed on the second substrate.

13. A method of manufacturing a metalens array, comprising:
bonding together a first substrate and a second substrate to create a substrate stack, wherein:
the first substrate comprises first metalens elements disposed thereon, each of the first metalens elements are spaced from each other, each of the first metalens elements have a first width from a first leading sidewall to a first trailing sidewall; and
the second substrate comprises second metalens elements disposed thereon and contacting a lower surface of the first substrate and an upper surface of the second substrate, each of the second metalens elements are spaced from each other, wherein:
- each of the second metalens elements have a second width from a second leading sidewall to a second trailing sidewall;
- the second trailing sidewall extend past the first trailing sidewall of each of the first metalens elements disposed on the first substrate; and
- the second leading sidewall of each of the second metalens elements extend past the first leading sidewall of each of the first metalens elements disposed on the first substrate;

dicing the substrate stack into a plurality of metalens arrays; and placing the metalens array into an imaging system.

14. The method of claim 13, wherein the metalens array is configured such that:
- a first beam of light incident on the metalens array is reflected and collimated into a reflected beam, and
- the metalens array is at least partially transparent to visible light in a direction parallel to the direction of the reflected beam.

15. The method of claim 13, wherein the first metalens elements comprise at least one red metalens element, at least one green metalens element, and at least one blue metalens element.

16. The method of claim 13, wherein each metalens element is an achromatic metalens element.

17. The method of claim 13, wherein at least one of the first substrate and the second substrate comprises glass.

18. The method of claim 13, wherein at least one of the first substrate and the second substrate comprises plastic.

19. The method of claim 13, wherein the placing the metalens array into an imaging system comprises embedding the metalens array into a lens.

20. The method of claim 13, wherein:
third metalens elements are disposed on a third substrate and contacting the lower surface of the second substrate and the upper surface of the third substrate, each of the third metalens elements are spaced from each other, wherein:
- each of the third metalens elements have a third width from a third leading sidewall to a third trailing sidewall;
- the third trailing sidewall of each of the third elements extend past the second trailing sidewall of each of the second metalens elements disposed on the second substrate; and
- the third leading sidewall of each of the third elements extend past the second leading sidewall of each of the second metalens elements disposed on the second substrate.

* * * * *